United States Patent [19]

Kim

[11] Patent Number: 5,058,944
[45] Date of Patent: Oct. 22, 1991

[54] DEVICE FOR OPENING AND CLOSING THE REAR WINDOW OF A MOTOR VEHICLE

[76] Inventor: Deuk S. Kim, 825-10 Manduck 1-Dong, Apt. 379, Book-Ku, Pusan, Rep. of Korea

[21] Appl. No.: 568,227

[22] Filed: Aug. 16, 1990

[30] Foreign Application Priority Data

Jun. 21, 1990 [KR] Rep. of Korea .................. 90-9394

[51] Int. Cl.⁵ .................................................. B60J 1/18
[52] U.S. Cl. ........................................ 296/146; 49/324
[58] Field of Search ............... 296/146, 201; 49/324, 49/356

[56] References Cited

U.S. PATENT DOCUMENTS

| 2,237,576 | 4/1941 | Rakoczy | 49/324 |
| 2,374,618 | 4/1945 | Perreton | 49/356 X |
| 2,714,035 | 7/1955 | Limberg et al. | 296/146 X |
| 2,762,648 | 9/1956 | Huzzard | 296/146 X |
| 2,836,457 | 5/1958 | Beerman et al. | 296/146 |
| 3,438,151 | 4/1969 | Evers et al. | 49/324 X |
| 4,261,612 | 4/1981 | Chrysler et al. | 296/146 |

FOREIGN PATENT DOCUMENTS 184922 8/1987 Japan .................................. 296/146

Primary Examiner—Margaret A. Focarino
Assistant Examiner—Joseph D. Pape
Attorney, Agent, or Firm—Birch, Stewart, Kolasch & Birch

[57] ABSTRACT

A device for opening and closing the rear window of a motor vehicle which includes supports, connectors, a worm gear, a two-way motor, and an on/off switch, whereby upon operating the two-way motor, the rear window is opened and closed.

6 Claims, 4 Drawing Sheets

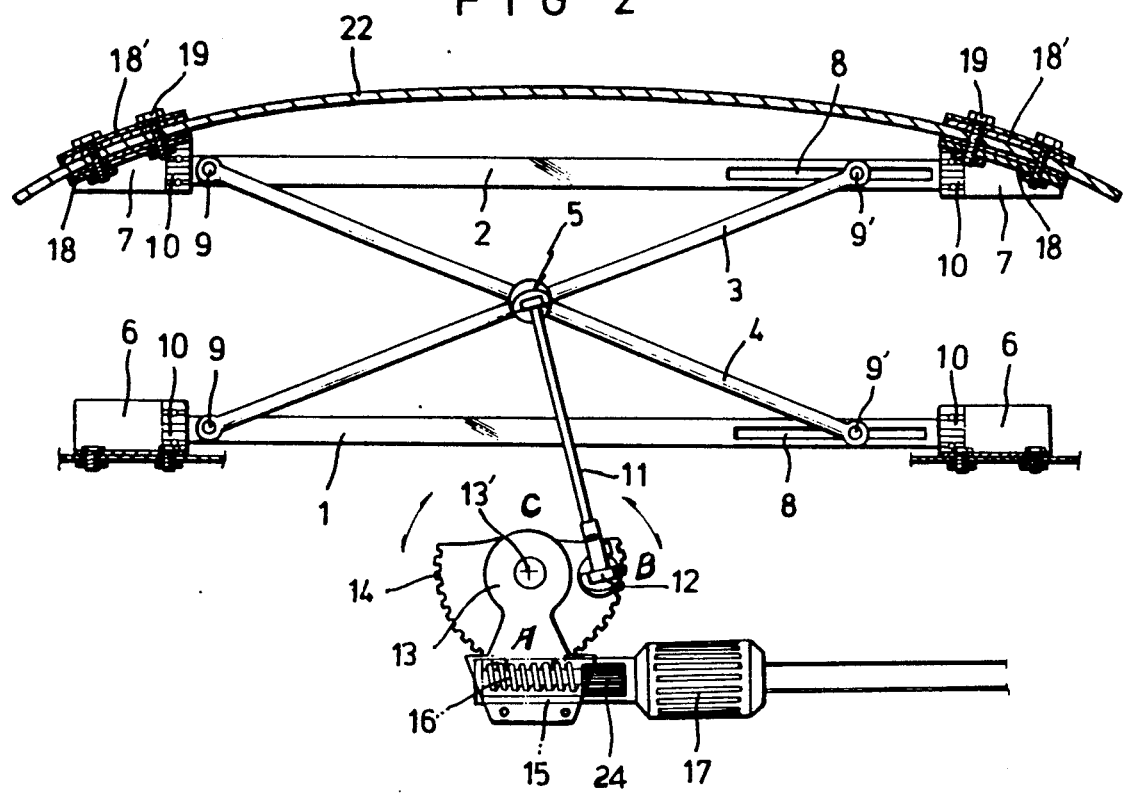

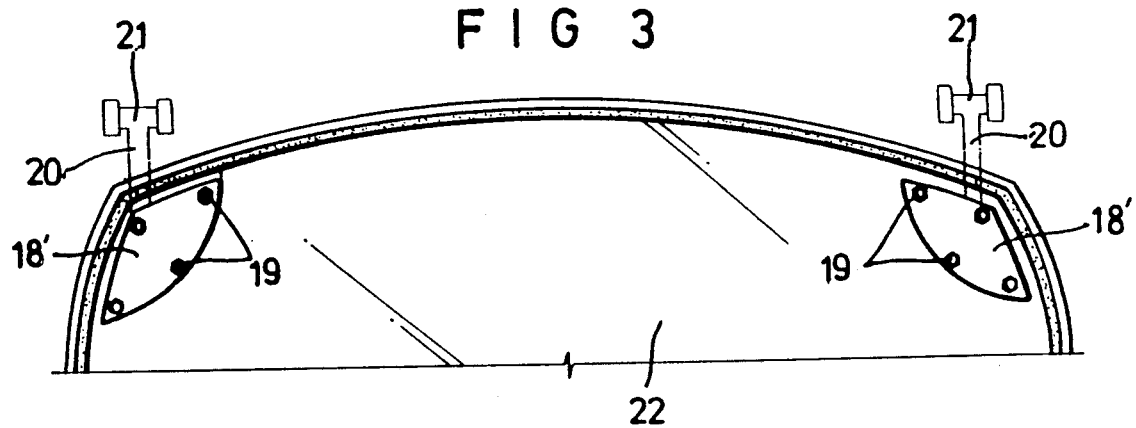
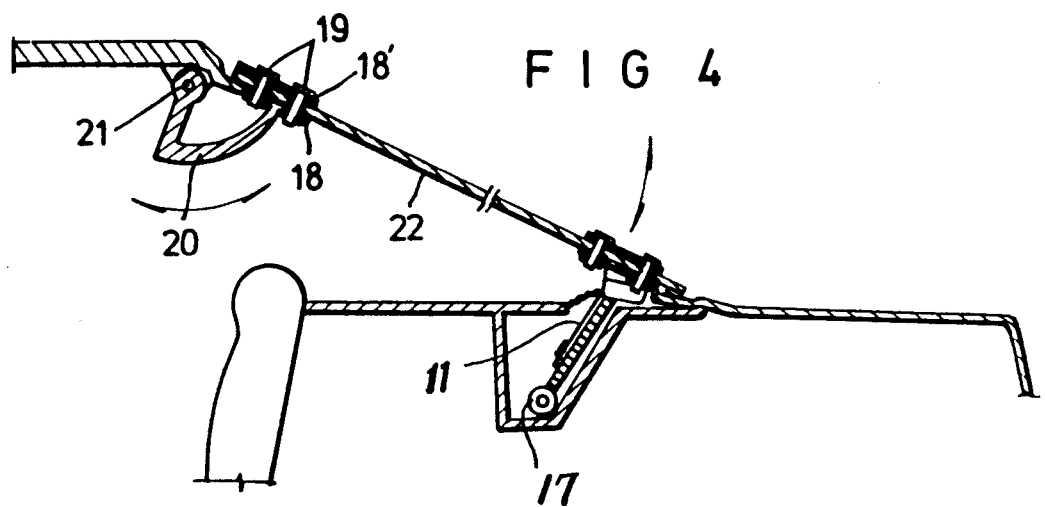

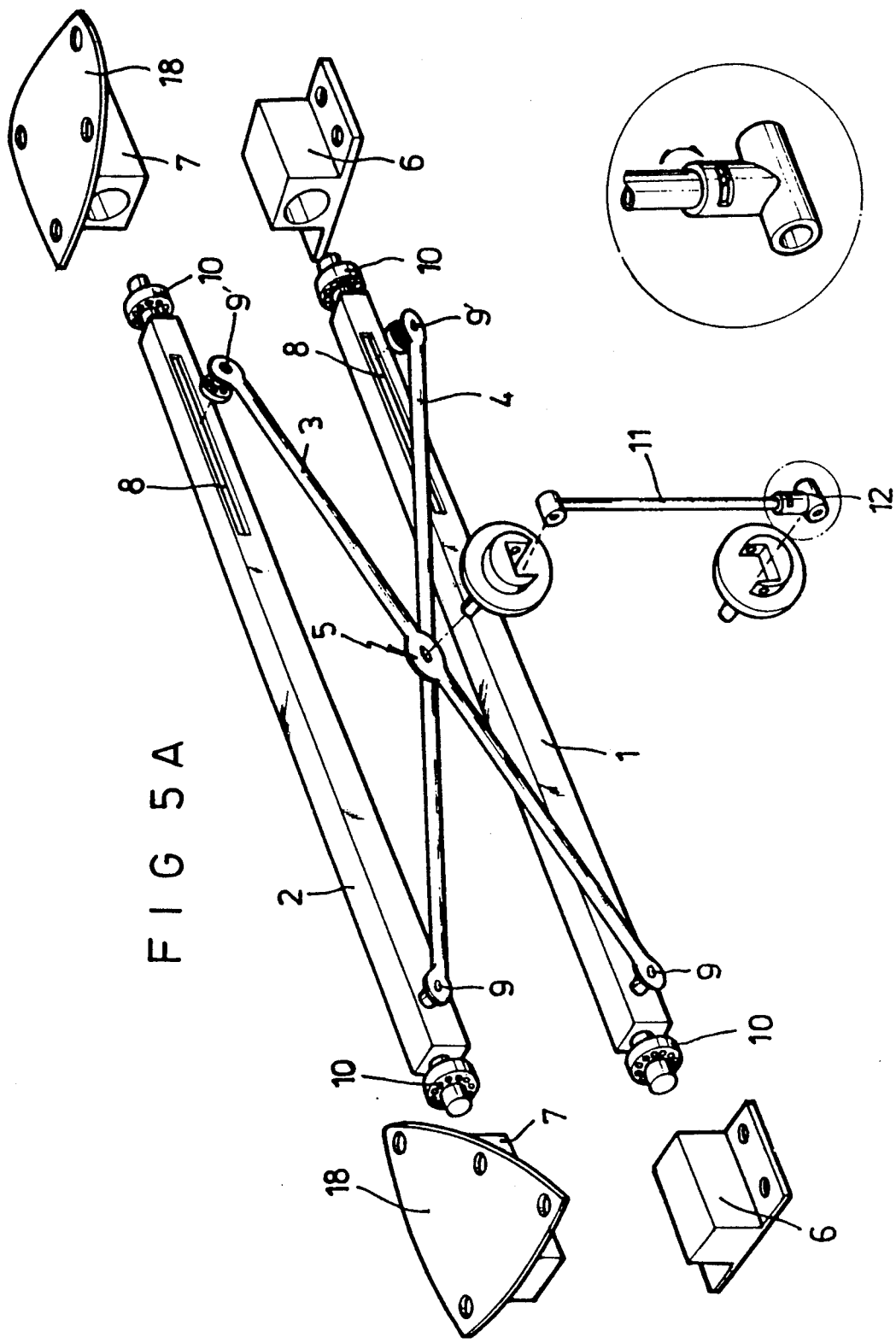
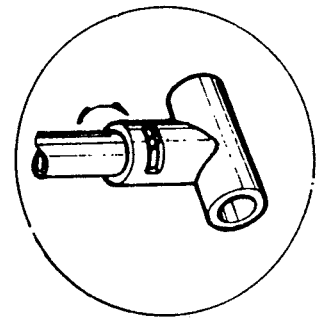
FIG 5A
FIG 5B

DEVICE FOR OPENING AND CLOSING THE REAR WINDOW OF A MOTOR VEHICLE

BACKGROUND OF THE INVENTION

1. Field of the Invention

The present invention relates to a device for opening and closing the rear window of a motor vehicle and more particularly, to an improved device for opening and closing the rear window of a motor vehicle which includes supports, connectors, a worm gear, a two-way motor, and an on/off switch, whereby upon operating the two-way motor, the rear window of the motor vehicle is opened and closed.

2. Description of the Prior Art

Various types of devices for opening and closing the roof window of a motor vehicle are well known in the art. However, upon opening such roof windows, the air flow cannot completely circulate and swirl therethrough so that the swirling air flow does not refresh the driver and passengers in mind and body and does not give them speedy feeling. Also, various types of hatchbacks of a motor vehicle are well known in the art. Such hatchbacks have to be opened by the hand so that it is inconvenient to operate them and such hatchbacks do not give speedy feeling to the driver and passengers in the open position thereof.

SUMMARY OF THE INVENTION

Accordingly, it is an object of the present invention to provide a device for opening and closing the rear window of a motor vehicle.

Another object of the present invention is to provide a rear window opening and closing device for a motor vehicle which includes a pair of horizontal supports both disposed in parallel wherein an upper support and a lower support of the horizontal supports are mounted to the rear window and the vehicle body, respectively, a pivotal cross connector pivotally connected to one end of the pair of horizontal supports and slidably, movably connected to the other end of the horizontal supports, a worm gear connected to a cross point of the pivotal cross connector, and a two-way motor connected to an on/off switch disposed at near the vehicle driver, whereby upon operating the two-way motor, the rear window of the motor vehicle is opened and closed.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a device for opening and closing the rear window of a motor vehicle which includes supports, connectors, a worm gear, a two-way motor, and an on/off switch, whereby upon operating the two-way motor, the rear window is opened and closed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is an enlarged front elevational view of the device for opening and closing the rear window according to the present invention containing cross-sectional portions in order to illustrate the construction of the device of the present invention;

FIG. 3 is a front elevational view of the rear window including a pair of adapting plates mounted thereto according to the present invention;

FIG. 4 is a sectional view of the device for opening and closing the rear window according to the present invention; and FIG. 5 is an exploded perspective view of the device for opening and closing the rear window according to the present invention.

DESCRIPTION OF THE PREFERRED EMBODIMENTS

Figure 1:
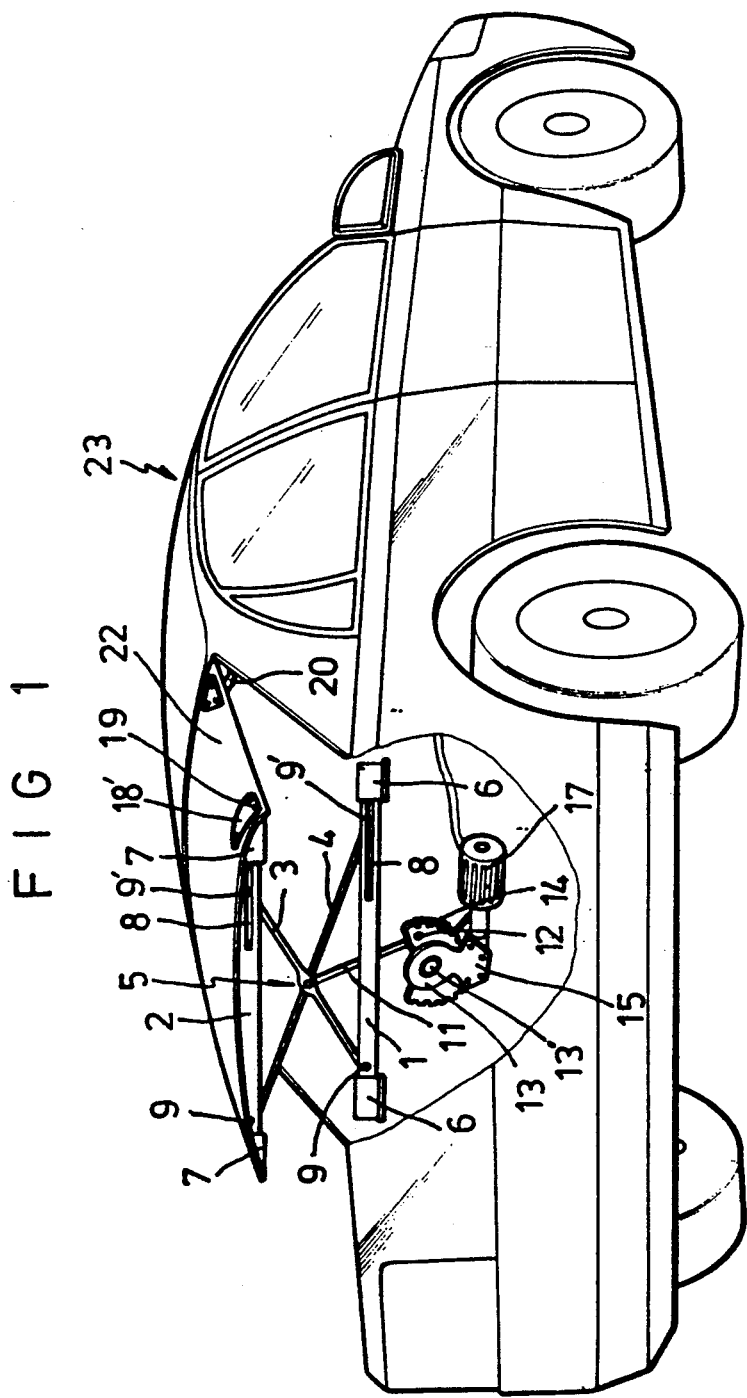
FIG. 1 is a perspective view of the device for opening and closing the rear window of a motor vehicle according to the present invention containing cut away portions in an order to illustrate the construction of the device of the present invention.

Referring now in detail to the drawings for the purpose of illustrating preferred embodiments of the present invention, the device for opening and closing the rear window of a motor vehicle as shown in FIGS. 1, 2, and 5 comprises an upper horizontal support 2, and a lower horizontal support 1 disposed in substantial parallel relationship with the upper horizontal support 1, a first connector 3 and a second connector 4 connected to the first connector 3 to form an intersection point 5, a moving rod 11 connected to the intersection point 5 at one end and connected to a driving gear 14 at the other end thereof, a worm gear 16 being in gearing relationship with the driving gear 14, a two-way motor 17 connected to the worm gear through a coupling 24, and an on/off switch (not shown) connected to the motor 17 and disposed at a dashboard of a motor vehicle 23.

As shown in FIGS. 2 and 5, the lower horizontal support 1 is provided with a pair of lower adapting plates 6 for slidably receiving both ends of the lower horizontal support 1 through bearings 10, respectively. The lower adapting plates 6 are mounted to back seat portions of a vehicle body 23' through bolts 19 and nuts 19', and elastic plates 18 (FIG. 2). Also, the upper horizontal support 1 is provided with a pair of upper adapting plates 7 for slidaby receiving both ends of the upper horizontal support 2 through bearing 10, respectively. The upper adapting plates 7 are mounted to the upper portions of the rear window 22 through bolts 19 and nuts 19', and elastic plates 18 (FIG. 2).

First end portions of first and second connectors 3 and 4 are pivotally connected to first end portions of lower and upper horizontal supports I and 2 through pivotal pins 9, respectively while second end portions of first and second connectors 3 and 4 are movably connected to each longitudinal channel 8 disposed at second end portions of lower and upper horizontal supports 1 and 2 through bearings 10 (FIG. 5). The moving rod 11 having an engaging end 12 disposed at both ends thereof is engaged with a pair of engagements 25 through the engaging ends 12 (FIG. 5). Each of the pair of engagements 25 is mounted to the intersection point 5 and one side portion of the driving gear 14 (FIG. 2), respectively. The driving gear 14 is supported by a driving gear support 13 and is rotated about a driving gear shaft 13, The worm gear 16 is disposed within a worm gear casing 15 in gearing relationship with the driving gear 14. The worm gear 16 is connected to the two-way motor 17 through the coupling 24. Also, the two-way motor 17 can be controlled by a remote controller (not shown) instead of the on/off switch. The two-way motor 17, worm gear casing 15, and driving gear are disposed in the vehicle trunk of the motor vehicle 23.

As shown in FIGS. 3 and 4, the rear window 22 of the motor vehicle 23 is provided with a plurality of C-shaped hinges 20. One end of the hinges 20 is pivotally connected to the back roof portion through a pivotal pin shaft 21 while the other end thereof is mounted to the upper portion of the rear window 22 through the bolt 19 and nut 19', and the elastic plate 18. Also, the upper adapting plates 7 are mounted to the lower portion of the rear window 22 through the bolts 19 and nuts 19', and the elastic plates 18.

The device for opening and closing the rear window of the motor vehicle 23 operates as follows:

As shown in FIG. 2, upon operating the on/off switch or the remote controller, when the two-way motor 17 is rotated in the counterclockwise direction, the engaging end 12 is moved to B portion from A portion, at that time, the moving rod 11 moves up and simultaneously the rear window 22 is opened in the middle. And the engaging end 12 is moved to C portion from B portion, at that time, the rear window simultaneously is opened in the full. In turn, when the two-way is operated in the clockwise direction, the engaging end 12 is moved to B portion from C portion. Thereafter, the engaging end 12 is moved to A portion from B portion, at that time, the rear window simultaneously is closed. In operation, there are the plurality of bearings 10 disposed within connecting points so that the rear window can be smoothly opened and closed. Also, when the trunk door of the motor vehicle 23, the two-way motor can optionally include a locking system therewith for avoiding the conflict of the rear window 22.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A device for opening and closing the rear window of a motor vehicle, the rear window having a lower side and an upper side, the device comprising:

an upper horizontal support having a upper longitudinal channel disposed in one end thereof, said upper horizontal support mounted to said lower side of the rear window, a lower horizontal support disposed in substantial parallel relationship with said upper horizontal support, said lower horizontal support having a lower longitudinal channel disposed in one end thereof, said lower horizontal support mounted to back seat portions of a vehicle body of said motor vehicle, a pair of connecting rods pivotally cross-linked with each other for forming a cross-point, said pair of connecting rods being pivotally connected to first end portions of said upper and lower horizontal supports and movably connected to second end portions of said upper and lower horizontal supports through said upper and lower longitudinal channels, a driving gear provided with a moving rod, said moving rod operatively connected to said cross point at one end thereof and connected to said driving gear at the other end thereof, a worm gear being in gearing relationship with said driving gear, and a two-way motor connected to said worm gear, whereby upon operating the two-way motor, the worm gear and driving gear rotate in the clockwise and counterclockwise directions, and the moving rod moves in the up and down direction, whereby the rear window of the motor vehicle is smoothly opened and closed.

2. The device of claim 1, wherein the upper and lower horizontal supports are provided with a plurality of adapting plates mounted to said lower side of the rear window and said back seat portions of the vehicle body of the motor vehicle through a bolt, a nut, and an elastic plate, respectively.

3. The device of claim 2, a plurality of bearings are inserted into spaces disposed between said upper and lower horizontal supports and said adapting plates.

4. The device of claim 1, the driving gear is supported by a driving gear support.

5. The device of claim 1, the worm gear is disposed within a worm gear casing.

6. The device of claim 1, wherein the driving gear, the worm gear, and the two-way motor are disposed in the vehicle trunk of the motor vehicle.

* * * * *